United States Patent
Nellans et al.

(10) Patent No.: US 10,489,295 B2
(45) Date of Patent: Nov. 26, 2019

(54) SYSTEMS AND METHODS FOR MANAGING CACHE PRE-FETCH

(71) Applicant: SanDisk Technologies LLC, Plano, TX (US)

(72) Inventors: David Nellans, Salt Lake City, UT (US); Torben Mathiasen, Fredericia (DK); David Flynn, Sandy, UT (US); Nisha Talagala, Livermore, CA (US)

(73) Assignee: SANDISK TECHNOLOGIES LLC, San Jose, CA (US)

( * ) Notice: Subject to any disclaimer, the term of this patent is extended or adjusted under 35 U.S.C. 154(b) by 0 days.

(21) Appl. No.: 13/829,152

(22) Filed: Mar. 14, 2013

(65) Prior Publication Data

US 2014/0101389 A1 Apr. 10, 2014

Related U.S. Application Data

(60) Provisional application No. 61/711,120, filed on Oct. 8, 2012.

(51) Int. Cl.
*G06F 12/0862* (2016.01)

(52) U.S. Cl.
CPC .... *G06F 12/0862* (2013.01); *G06F 2212/602* (2013.01); *G06F 2212/6022* (2013.01)

(58) Field of Classification Search
CPC .......... G06F 12/0862; G06F 2212/602; G06F 2212/6022; G06F 2212/6024; G06F 2212/6026; G06F 2212/6028; G06F 9/3802; G06F 9/383; G06F 9/3814; G06F 9/30047

USPC ........................................................ 711/137
See application file for complete search history.

(56) References Cited

U.S. PATENT DOCUMENTS

| | | | | |
|---|---|---|---|---|
| 6,026,468 A | * | 2/2000 | Mase et al. ................... | 711/111 |
| 6,173,392 B1 | * | 1/2001 | Shinozaki ..................... | 712/207 |
| 6,553,446 B1 | * | 4/2003 | Miller ................ | G06F 13/4045 |
| | | | | 710/306 |
| 7,042,813 B2 | * | 5/2006 | Millikan ............... | G11B 19/04 |
| | | | | 369/30.23 |
| 7,177,985 B1 | * | 2/2007 | Diefendorff ........ | G06F 12/0862 |
| | | | | 711/118 |
| 7,788,427 B1 | * | 8/2010 | Yang .............................. | 710/62 |

(Continued)

OTHER PUBLICATIONS

Subramaniam et al. Criticality-based optimizations for efficient load processing. High Performance Computer Architecture, 2009. HPCA 2009. IEEE 15th International Symposium. pp. 419-430. ISSN : 1530-0897.*

(Continued)

*Primary Examiner* — Tracy A Warren
(74) *Attorney, Agent, or Firm* — Kunzler Bean & Adamson, PC (57) ABSTRACT

A system includes a data store and a memory cache subsystem. A method for pre-fetching data from the data store for the cache includes determining a performance characteristic of a data store. The method also includes identifying a pre-fetch policy configured to utilize the determined performance characteristic of the data store. The method also includes pre-fetching data stored in the data store by copying data from the data store to the cache according to the pre-fetch policy identified to utilize the determined performance characteristic of the data store.

24 Claims, 6 Drawing Sheets

(56) References Cited

U.S. PATENT DOCUMENTS

| | | | |
|---|---|---|---|
| 7,934,054 B1* | 4/2011 | Moll et al. | 711/113 |
| 8,082,433 B1* | 12/2011 | Fallone et al. | 713/2 |
| 8,332,570 B1* | 12/2012 | Cook et al. | 711/6 |
| 8,621,157 B2* | 12/2013 | Loh | G06F 12/0862 711/137 |
| 2002/0002658 A1* | 1/2002 | Okayasu | 711/137 |
| 2004/0148491 A1* | 7/2004 | Damron | 712/34 |
| 2004/0267787 A1* | 12/2004 | Huras et al. | 707/100 |
| 2005/0071617 A1* | 3/2005 | Zimmer | G06F 9/4401 713/1 |
| 2006/0004996 A1* | 1/2006 | Gonion | G06F 8/443 712/241 |
| 2006/0136696 A1* | 6/2006 | Grayson | G06F 12/1027 711/206 |
| 2006/0224860 A1* | 10/2006 | Colavin | G06F 9/383 712/207 |
| 2007/0005883 A1* | 1/2007 | Trika | 711/113 |
| 2008/0229071 A1* | 9/2008 | Shioya | G06F 12/0862 712/207 |
| 2009/0198909 A1* | 8/2009 | Speight et al. | 711/137 |
| 2010/0077197 A1* | 3/2010 | Ergan et al. | 713/2 |
| 2010/0241654 A1* | 9/2010 | Wu et al. | 707/769 |
| 2010/0241811 A1* | 9/2010 | Solihin | G06F 12/0862 711/137 |
| 2010/0268927 A1* | 10/2010 | De Ven | 713/2 |
| 2011/0113199 A1* | 5/2011 | Tang | G06F 12/0862 711/130 |
| 2012/0159072 A1* | 6/2012 | Hida | G06F 12/0862 711/119 |
| 2012/0311269 A1* | 12/2012 | Loh et al. | 711/133 |
| 2013/0185475 A1* | 7/2013 | Talagala et al. | 711/102 |
| 2014/0047159 A1* | 2/2014 | Ahwal et al. | 711/103 |
| 2014/0052956 A1* | 2/2014 | Moll | 711/205 |
| 2014/0149677 A1* | 5/2014 | Jayasena et al. | 711/137 |

OTHER PUBLICATIONS

Josephson et al. "DFS: A File System for Virtualized Flash Storage" ACM Transactions on Storage, vol. 6, Issue 3, Article No. 14, (Sep. 2010), 15 pages.

"Direct Cache" Fusion-io, Inc., available at: http://www.fusionio.com/load/-media-/26ojwo/docsLibrary/FIO_DS_directCache.pdf, 2 pages, las accessed Mar. 14, 2013.

"Fusion Virtual Storage Layer" Fusion-io Inc., available at: http://www.fusionio.com/load/-media-/1ufytn/docsLibrary/FIO_DS_VSL.pdf, 1 page, last accessed Mar. 14, 2013.

"Understanding the Flash Translation Layer (FTL) Specification" Intel Corporation, Application Note AP684, Order No. 297816-002, (Dec. 1998), available at: http://www.fusionio.com/load/-media-/1ufytn/docsLibrary/FIO_DS_VSL. pdf, 20 pages, last accessed Mar. 14, 2013.

"Media Storage Formats Specification" PC Card Standard, vol. 10, available at: http://www.scribd.com/doc/88201658/PC-Card-Standard-8-0-Volume-10-Media-Storage-Formats-Specifications, 52 pages, last accessed Mar. 14, 2013.

* cited by examiner

SYSTEMS AND METHODS FOR MANAGING CACHE PRE-FETCH

CROSS-REFERENCE TO RELATED APPLICATIONS

This application claims the benefit of priority of U.S. provisional application 61/711,120, filed on Oct. 8, 2012 and entitled "Disk-Optimized Warming of a Memory Cache" which is incorporated herein by reference in its entirety.

BACKGROUND

Block caching to flash memory devices (or "caches") allows fast performance for a dataset that is larger than fits natively in the flash device. Some applications invalidate the cache on startup for a variety of reasons including to ensure there is no stale data in the cache in a high availability environment. This can lead to a "cold cache" that is empty on startup. Cache invalidation can be valuable because it provides a very easy, if not necessary, interface for applications to guarantee consistency among groups of cached nodes.

Initially, filling a "cold cache" with valid data is sometimes referred to as "warming the cache." One conventional method of warming the cache includes application use, where each block accessed from the data store connected to the cache by the application is then stored at the cache until the cache is at full capacity. In some embodiments, data stored in the cache is not replaced or rewritten until the cache is at full capacity. A cache at full capacity is more efficient than an empty cache or a partially filled cache because reading from the cache is faster than reading the same data from the data store. Blocks are typically accessed on application terms, such that applications that have random input/output to the cache generally take a long time to warmup a large cache. A long warm up period for the cache may result in a less efficient cache due to requiring more accesses to the data store than if the cache is warmed faster.

Conventional approaches typically warm up a cold cache at run time, with the first reference of a block bringing the corresponding data into the cache. Certain applications may access data stored in the cache based on files associated with the applications, rather than blocks associated with the cache, such cache warming policies may result in significant random input/output (I/O). Warming the cache based on random I/O from the applications is a relatively slow type of access to spinning storage drives due to the mechanical movement required to access the random locations on the storage drive. Thus, warming the cache based on random I/O can take a long time, especially as caches continue to grow larger. The larger a cache is, the longer it takes to fill the cache with valid data. Sequential access to spinning storage drives requires much less mechanical movement and, therefore, much less time to access the specified locations.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Reference to a computer readable medium may take any physical form capable of storing machine-readable instructions, at least for a time in a non-transient state, on a digital processing apparatus. A computer readable medium may be embodied by a compact disk, digital-video disk, a blu-ray disc, a magnetic tape, a Bernoulli drive, a magnetic disk, flash memory, integrated circuits, or other digital processing apparatus memory device.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments describe a warming system for a memory cache. As used herein, the term "warming" is interpreted to include pre-fetching data in a cache that is otherwise not at full capacity with valid data. In at least one embodiment, a pre-fetch engine recognizes a characteristic (also referred to as a performance characteristic, performance parameter, etc.) of the data store and implements a pre-fetch process that is compatible with, customized for, or optimized for the recognized characteristic of the data store. In a further embodiment, the pre-fetch engine specifically determines which pre-fetch process to use based on how efficiently the data store can be utilized while retrieving and loading pre-fetch data into the cache.

In another embodiment, the pre-fetch engine warms the cache by copying data to the memory cache from a connected data store. In some embodiments, the pre-fetch engine determines which data to copy based on an access request to a logical block address (LBA) by an application and sequentially pre-fetches data corresponding to neighboring LBAs. Neighboring LBAs may include, but are not limited to, LBAs that sequentially precede and/or follow a particular LBA, with reference to whatever numerical or other designations might be used to designate the order of the LBAs. In other embodiments, the pre-fetch engine determines which data to copy based on block identifiers, or tags, that are stored prior to rebooting or otherwise resetting the memory cache. For example, the block identifiers may identify data stored in the memory cache prior to a reboot of the memory cache. Additionally, the pre-fetch engine may monitor the bandwidth used to warm the cache so that the cache may be warmed using excess bandwidth not allocated to or taken by application access to the data store.

Sequential over-fetching, or pre-fetching data sequentially following data requested by an application, may significantly reduce the time needed to warm the cache. Consequently, a policy that allows the cache to warm based on sequentially pre-fetching data from the data store to the cache (compared with putting only the requested data in the cache) may significantly reduce the warming period, thereby increasing the efficiency of the cache. Alternatively, a policy that uses tags or block identifiers to establish a priority for warming blocks may increase the efficiency of the cache even before warming the entire cache. Additionally, warming the cache during startup as well as during application access to the cache may further increase the efficiency of the cache. In some embodiments, the pre-fetch engine may have global knowledge of the cache capacity and the aggregate bandwidth going to the data store. Because of this knowledge, the pre-fetch engine may make pre-fetching decisions and limit the bandwidth used to pre-fetch data to warm the cache to avoid interfering with data access operations to the data store by applications that are currently running. Additionally, the pre-fetch engine may stop or otherwise control pre-fetching when the cache is already full so that data is not pre-fetched unnecessarily.

Figure 1:
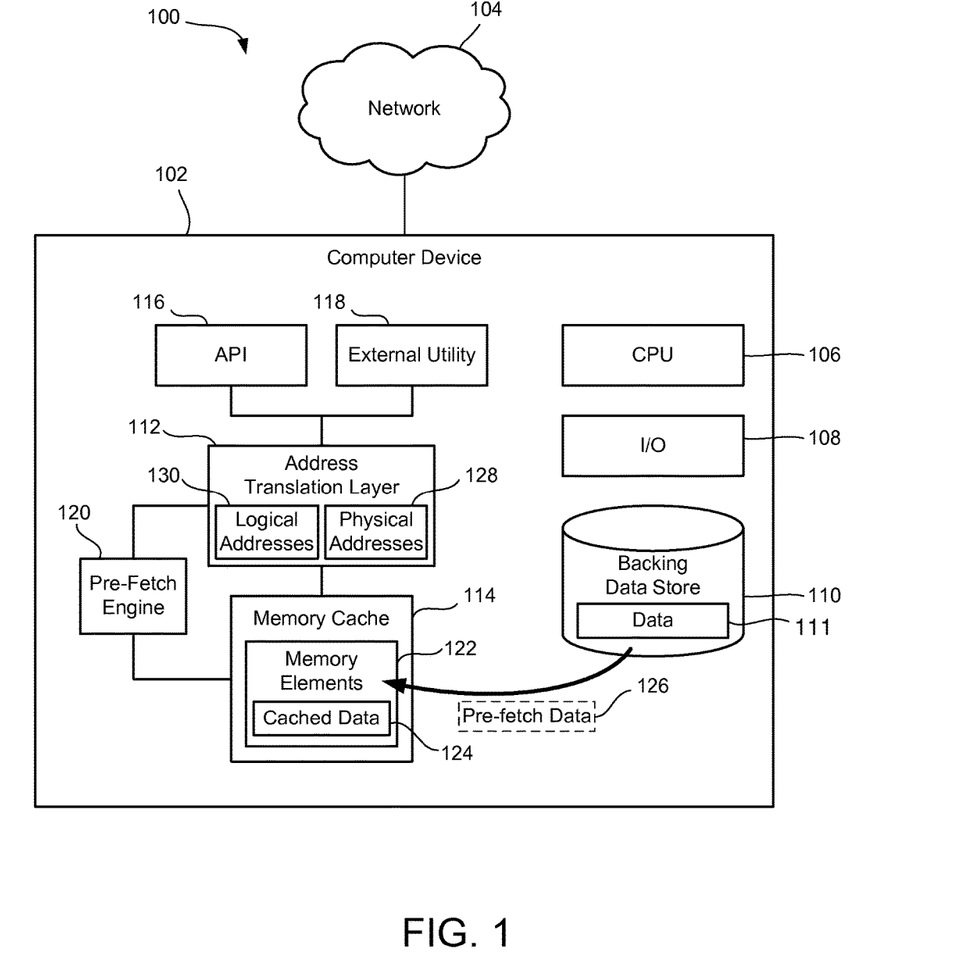
FIG. 1 depicts a schematic diagram of one embodiment of a cache warming system.

FIG. 1 depicts a schematic diagram of one embodiment of a cache warming system 100. The depicted system 100 includes various components, described in more detail below, that are capable of performing the functions and operations described herein. In one embodiment, at least some of the components of the cache warming system 100 are implemented in a computer system. For example, the functionality of one or more components of the cache warming system 100 may be implemented by computer program instructions stored and executed on a computer device 102. The cache warming system 100 may be implemented in a clustered environment, described in more detail below, with additional computer devices. The computer device 102 may include various components, including a processor (such as a CPU) 106, input/output devices 108, a controller (not shown), a backing data store 110, an address translation layer (ATL) 112, and a memory cache 114. Some or all of the components of the cache warming system 100 may be stored on a single computing device 102 or on a network 104 of computing devices 102, including a wired and/or wireless communication network. The cache warming system 100 may include more or fewer components or subsystems than those depicted herein. In some embodiments, the cache warming system 100 may be used to implement the methods described herein.

The illustrated cache warming system 100 also includes an application program interface (API) 116, an external utility 118, and a pre-fetch engine 120. In general, the pre-fetch engine 120 operates in conjunction with the ATL 112 and/or the memory cache 114 to warm up the memory cache 114 by pre-fetching data 111 from the backing data store 110 to fill up the memory elements 122 of the memory cache 114 with cached data 124. In some embodiments, these pre-fetch operations include operations to initially fill up the memory cache 114 from a state in which one or more of the memory elements 122 includes dirty or outdated data. In other embodiments, these pre-fetch operations include operations to replace cached data 124 that is older or otherwise available for replacement with the memory cache 114. For convenience, the data 111 from the backing data store 110 may be referred to as pre-fetch data 126 as it is selected and transmitted to the memory cache 114. Thus, the cached data 124 in the memory cache 114 is the same as the pre-fetch data 126 retrieved from the data 122 in the backing data store 110.

Although the pre-fetch engine 120 is schematically shown separately from the ATL 112 and the memory cache 114, some or all of the functionality of the pre-fetch engine 120 may be implemented in the ATL 112 or the memory cache 114. Alternatively, some or all of the functionality of the pre-fetch engine 120 may be distributed between the ATL 112 and the memory cache 114. Moreover, to the extent that the ATL 112 may be implemented within a controller on a separate card or device (e.g., an SSD) which implements the memory elements 124, such as in a flash translation layer (FTL), some or all of the functionality of the pre-fetch engine 120 may be implemented within the controller. In another embodiment, to the extent that the ATL 112 may be implemented within a device driver layer of an operating system, such as in a storage management layer (SML) which manages associations between virtual blocks and physical blocks on one or more connected SSD devices, some or all of the functionality of the pre-fetch engine 120 may be implemented within the SML. In general, the SML presents a logical address space to one or more storage clients. One example of a SML is the Virtual Storage Layer® of Fusion-io, Inc. of Salt Lake City, Utah.

While there are many potential operations involved in pre-fetch caching operations in some embodiments the pre-fetch engine 120 selects a particular pre-fetch approach that is compatible with a particular type of backing data store 110. The compatibility may relate to a level of data transfer efficiency from the data store 110 to the memory cache 114, timing for how fast the memory cache 114 can be warmed or filled, or any other efficiency parameter related to the retrieval and storage of the cached data 122 within the memory cache 114. By selecting a pre-fetch approach, or process, that is compatible with the backing data store 110, the pre-fetch engine 120 can contribute to efficiently pre-fetching data from the backing data store 110 to fill the memory cache 114. Additional embodiments related to selecting a pre-fetch approach based on characteristics of the backing data store 110 are provided below in the description of FIG. 3.

Some of the general categories of pre-fetch processes that may be implemented by the pre-fetch engine 120 are explicit pre-fetching and implicit pre-fetching. Explicit pre-fetching relates to performing pre-fetch operations in response to a hint or trigger that originates outside of the pre-fetch engine 114. Explicit pre-fetch operations are not necessarily dependent on or associated with other read/write access requests to the backing data store 110. In some embodiments, explicit pre-fetching may be implemented in conjunction with instructions from the API 116 and/or the external utility 118, as described below. Implicit pre-fetching relates to performing pre-fetch operations that are dependent on or associated with a typical read/write access request to the backing data store 110.

In one embodiment, the API 116 allows an application to interact with the ATL 112 and the memory cache 114, as well as the backing data store 110. The API 116 may submit access requests for data stored on the data store 110. If the requested data is also stored on the memory cache 114, then the data may be accessed more quickly from the memory cache 114, instead of being retrieved from the backing data store 110.

The application may make use of ATL operations or protocols to inform the pre-fetch engine 120 for managing pre-fetch priority when warming the cache 114. For example, the application may identify blocks on the data store 110 that are likely and/or unlikely to be used in the future by the application. The pre-fetch engine 120 may assign a priority to these blocks according to the likelihood of future use. For example, the pre-fetch engine 120 may assign a high priority for the blocks that are likely to be used and a low priority for the blocks that are unlikely to be used. The high priority blocks may be included in sequential pre-fetches before the low priority blocks. In other embodiments, the low priority blocks may be excluded from the warming process completely. Because the application may interact with the pre-fetch engine 120 to assign or determine pre-fetch priority, the pre-fetch engine 120 may provide fast sequential warming from the data store 110 at startup as well as during application use. This may inherently improve the cache hit rate during the warm-up phase of the memory cache 114.

In one embodiment, the external utility 118 interacts with the pre-fetch engine 120 and the memory cache 114 for warming the memory cache 114. In one embodiment, the external utility 118 is a user space utility. In another embodiment, the external utility 118 includes (or is implemented within) logic in a file system or operating system. In another embodiment, the external utility 118 includes a driver for the memory cache 114 or data store 110. The external utility 118 may instruct the pre-fetch engine 120 to pre-fetch data using sequential reads of blocks on the data store 110. Because the external utility 118 uses reads to warm the cache blocks, the external utility 118 may be run concurrently with application access. If the utility 118 is run concurrently with an application, an I/O priority of the utility 118 may be set to not compete for data store bandwidth with application access. The embodiments including a hint or trigger from the API 116 or the external utility 118 for warming the cache 114 may be referred to as explicit sequential pre-fetch processes.

In other embodiments, the pre-fetch engine 120 may perform implicit sequential pre-fetch approaches. In some embodiments, implicit pre-fetching is performed during application runtime. In implicit sequential pre-fetch approaches, the pre-fetch engine 120 performs some or all of the operations for warming the memory cache 114 without a hint or trigger from the API 116 or the external utility 118 and may determine the pre-fetching priority based primarily on access requests to the data store 110. In implicit sequential pre-fetch, if the cache 114 is not full, when a data request is received, the pre-fetch engine 120 over-fetches the next N blocks in anticipation that those blocks may be referenced in the future. Over-fetched data may then be inserted into the cache 114, without being returned to the user application that initiated the data request. Over-fetching based on a sequential range of blocks on the data store 110 is essentially "free" in modern hard drives. Generally, the overhead in filling a data request is predominantly seek-based latency, so there is very little penalty for performing sequential over-fetching.

The ATL 112 may map the physical addresses 128 of blocks or groups of memory elements 122 in the memory cache 114 to logical addresses 130 such as logical block addresses (LBAs) used by the operating system. In one embodiment, the ATL 112 operates independent of an existing operating system and file system to map physical addresses 128 such as physical block addresses (PBAs) of the memory elements 122 to the LBAs in an organized structure. In other embodiments, the ATL 112 operates in conjunction with an existing operating system on the computer device 102 to map the physical addresses 128 of the memory elements 120 to the LBAs 122. The LBAs 122 allow the ATL 112 to maintain a logical organization for the memory cache 114 while potentially storing related data in different physical locations in the memory cache 114. The ATL 112 may also manage where data is written so that data is written to the correct locations in the memory cache 114 based on where the cache 114 has been cleaned or erased, so that subsequent access requests to the data are directed to the correct physical locations in the memory cache 114. These operations performed by the ATL 112 allow the memory cache 114 to be used by an operating system or file system in a way that is similar to other block storage devices such as the data store 110.

The ATL 112 also may map the LBAs to PBAs on the data store 110, in an embodiment in which the data store 110 is not a block-based storage device. This may allow the ATL 112 to manage and track the data on the data store 110. In one embodiment, the ATL 112 maps an LBA to a single PBA of the data store 110.

In another embodiment, the ATL 112 manages storing block allocation information for each read/write block within the memory cache 114. Each read/write block corresponds to a logical block used by the ATL 112 in conjunction with operations with the operating system and higher level software layers. Within the memory cache 114, the read/write blocks are subdivisions of erase units, which may include one or more erase blocks. Each read/write block also corresponds to a physical address (or group of physical addresses) of the memory elements 122 associated with the read/write block. Using this addressing approach, the ATL 112 may translate the logical address of a corresponding read/write block to a physical address of the corresponding memory elements 122 (e.g., as a page of memory elements 122). In order to facilitate these mappings, the ATL 112 may manage various data structures. For example, the ATL 112 may manage a block allocation map (BAM) for each erase unit to indicate an allocation status of each read/write block.

In one embodiment, the status of each read/write block may be free, deleted, bad, or allocated. The ATL 112 also includes functionality to map the logical addresses of the read/write blocks to the corresponding physical addresses of the memory elements 122 within the memory cache 114.

The memory cache 114 may be any kind of memory cache 114. The memory cache 114 may be a non-volatile memory cache 114 in which data stored on the memory cache 114 persists across reboots, such that on reboot of the memory cache 114, the data may need to be invalidated for various reasons. These reasons may include, but are not limited to, changes in the data for the corresponding locations on the data store 110 and/or storing information related to the ATL 112 in volatile memory which is erased during a reboot. The memory cache 114 may be implemented with a write-back policy, a write-through policy, a write-around policy, or any combination thereof.

In one embodiment, memory elements 122 in the memory cache 114 for storing data are organized in an array or in multiple arrays. The memory cache 114 may be a caching device implemented using any known caching technology. In some embodiments, the memory elements 120 are part of an integrated circuit (IC) package or chip. Each chip may include one or more die, and each die includes an array of memory elements 122.

The memory cache 114 may be used for storing data associated with the computer device 102 or other computer devices 102 connected to a network 104. Although the computer device 102 is shown with a single memory cache 114, other embodiments of the computer device 102 may include more than one memory cache 114. Similarly, multiple memory caches 114 may be implemented at various locations within the nodes of the computer network 104. Embodiments of the computer network 104 may provide dedicated or shared memory resources for one or more of the computer devices 104, though other implementations of storage/memory resources or capacity may be used in conjunction with the network 104.

The memory elements 122 may be operated in a variety of modes. In general, solid-state memory elements 122 can be set to different programmable states that correspond to different bits or bit combinations. In a specific example, the memory elements 122 may be operated in a single level cell (SLC) mode to store a single bit of data. In another example, the memory elements 122 may be operated in a multiple level cell (MLC) mode to store two or more bits of data. In another example, the memory elements 122 may be MLC memory elements configured to operate in an SLC mode. In other embodiments, the memory cache 114 includes other types of memory elements 122.

Figure 2:
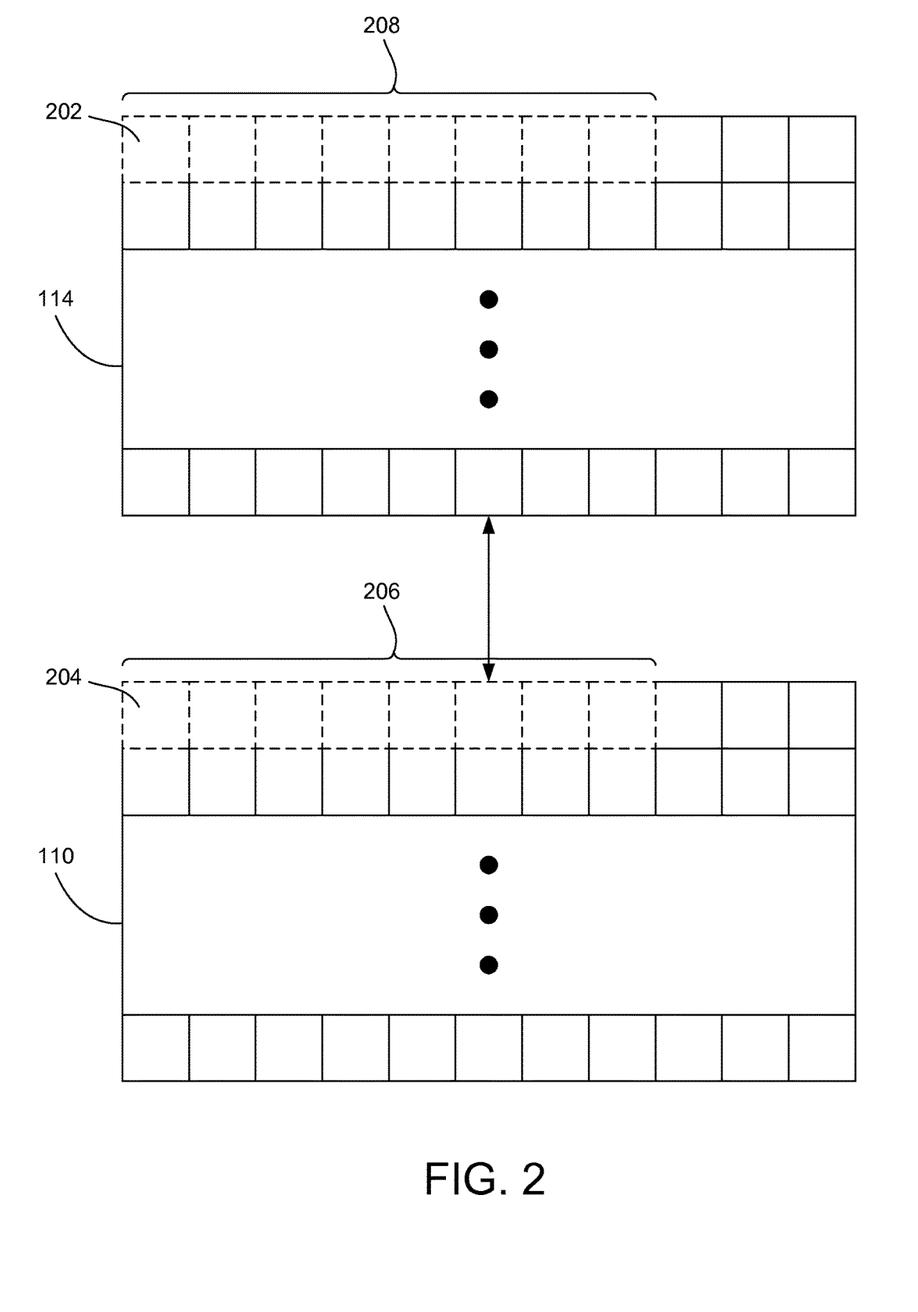
FIG. 2 depicts a schematic diagram of one embodiment of the memory cache of FIG. 1 connected to a data store.

FIG. 2 depicts a schematic diagram of one embodiment of the memory cache 114 of FIG. 1 connected to a data store 110. Although the memory cache 114 is described herein in conjunction with the cache warming system 100 of FIG. 1, the memory cache 114 may be used in conjunction with any type of cache warming system 100. Alternatively, the cache warming system 100 may be used in conjunction with any type of memory cache 114.

As depicted, the memory elements 122 of the cache 114 may be divided or organized into blocks 202 or sectors of predetermined size. For example, the blocks 202 may be 512 bytes. The blocks 202 are programmed in full pages, and N pages fit within each erase block. The LBAs 122 present logical addresses from 0-N to applications accessing the memory cache 114, rather than physical addresses. The ATL 112 maps each LBA to its corresponding PBA, so that access requests by applications referencing an LBA 122 of the memory cache 114 are directed to the corresponding PBAs. In one embodiment, each LBA 122 corresponds to the same number of PBAs (for example, one LBA 122 to one PBA), such that each LBA 122 is the same size. The ATL 112 may maintain the mappings between each of the LBAs 122 and the corresponding PBAs so the pre-fetch engine 120 or the ATL 112 may determine where to write, read, or erase data in the memory cache 114 for each access request from an application. In various embodiments, the ATL 112 may store the mappings in any non-volatile storage device so that the ATL 112 is able to retain the mappings even if the memory cache 114 is turned off. Alternatively, the ATL 112 may store the mappings in an area of the memory cache 114 that is not invalidated at startup.

The data store 110 is also organized into blocks 204. In some embodiments, the data store 110 includes one or more NAND flash memory devices. In other embodiments, the data store 110 includes other types of data storage, such as a mechanical hard drive. In one embodiment in which the data store 110 includes a NAND flash device having N banks of blocks 204, when the memory cache 114 is warming, the pre-fetch engine 120 may locate a block 204 from the data store 110 corresponding to an access request from an application and determine an additional sequence 206 of blocks on the same page or on the same bank of the NAND flash device to pre-fetch to the memory cache 114. In another embodiment, the sequence 206 of blocks corresponds to blocks logically grouped on a bank that is not currently busy. In one embodiment in which the data store 110 is a mechanical hard drive, when the memory cache 114 is warming, the ATL 112 locates a block 204 from the data store 110 corresponding to an access request from an application, and the pre-fetch engine 120 determines an additional sequence 206 of blocks physically proximate to the accessed block 204 for pre-fetching data. For example, the pre-fetch engine 120 may select a number of physically sequential blocks preceding and/or following the accessed block 204 for pre-fetching. In other embodiments, the pre-fetching process is performed using an access method that is determined to be most optimal for the specific data store 110 to minimize pre-fetch completion latency.

The number of sequential blocks for pre-fetching may alternatively be determined at the time of pre-fetching, for example, based on the available bandwidth to the data store 110. For example, the number of blocks pre-fetched may be determined to use all of the available bandwidth or a certain percentage of the available bandwidth. If the available bandwidth changes, the number of blocks in each pre-fetch operation may change to account for the change in bandwidth. Thus, the pre-fetching process uses only the allotted portion of the available bandwidth and does not interfere with concurrent application access to the data store 110. The sequence 206 of blocks from the data store 110 for the selected blocks 204 is then copied to a sequence 208 of LBAs 122 in the memory cache 114, while only the requested block 204 is returned to the application that requested the accessed block 204 from the data store 110.

Figure 2A:
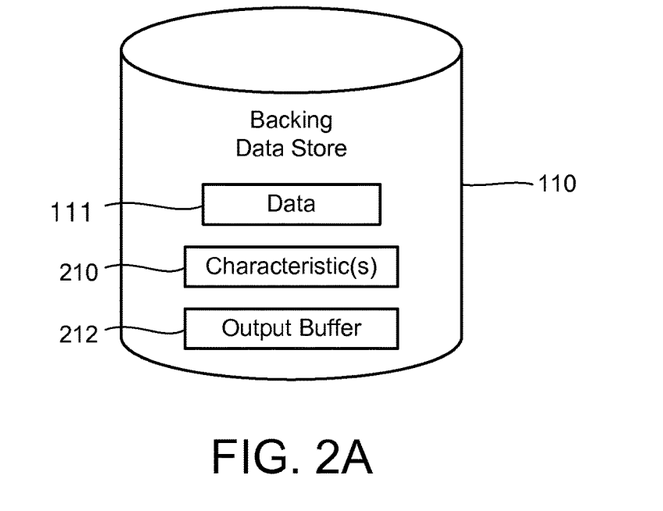
FIG. 2A depicts a schematic diagram of one embodiment of the backing data store of FIG. 1.

FIG. 2A depicts a schematic diagram of one embodiment of the backing data store 110 of FIG. 1. Although the backing data store 110 is described herein in conjunction with the cache warming system 100 of FIG. 1 the backing data store 110 may be used in conjunction with any type of cache warming system 100.

The backing data store generally includes functionality to store data 111 in some permanent, non-transitory, or other relatively long-term state. The data 111 may be any type of data stored by an operating system on a host device, any type of data stored by an application having access to the backing data store 110, or any other type of data. In the illustrated embodiment, the backing data store 110 also includes one or more characteristics 210 and an output buffer 212.

In one embodiment, the characteristic(s) 210 of the backing data store may be stored explicitly within a location of the backing data store 110. Alternatively, the characteristic(s) of the backing data store 110 may be inherent in the physical structure, logical arrangement, control logic, or other features of the backing data store 110. Some examples of such characteristics of the backing data store 110 include, but are not limited to, the type of storage technology implemented in the backing data store 110, the order in which data is physically stored on the backing data store 110, the type of bus bandwidth available to the backing data store 110, the type of data stored on the backing data store 110, and so forth. Other embodiments may include additional characteristics of the backing data store 110 in addition to, or instead of, those characteristics listed herein. Additionally, in some embodiments, the backing data store 110 may store explicit representations of one or more characteristics. For example, in one embodiment, the backing data store 110 may store a parameter to indicate the arrangement of how data is physically stored on the backing data store. In a more specific example, the parameter may be a sequential access parameter indicative of sequential storage locations for data on the backing data store 110. Alternatively, the sequential access parameter may indicate the manner in which data is written to and/or read from the backing data store 110. In another specific example, the parameter may be a random access parameter indicative of a random or pseudo-random arrangement of the data on the backing data store or the manner in which data is written to and/or read from the backing data store 110.

In some embodiments, the characteristics 210 describing and/or stored on the backing data store 110 are static to indicate permanent or relatively stable characteristics of the backing data store 110. In other embodiments, some or all of the characteristics 210 are dynamic and change over time. For example, a characteristic may change to indicate the amount of data and/or the condition(s) of the data stored on the backing data store 110. As the amount of data changes, or as the condition of some or all of the data changes, the characteristic of the data store may adjust according.

The illustrated output buffer 212 may be integrated with, or coupled to, the backing data store 110 in order to temporarily hold (i.e., buffer) data as it is retrieved from the individual storage locations and stored prior to transfer across the bus or busses coupling the backing data store 110 to other components of the computer device 100. The 212 buffer may be any size and may be implemented with any technology adequate to temporarily store the data as part of a data transfer operation. In some embodiments, the output buffer 212 is filled with data retrieved from the backing data store 110 in response to a request for all of the retrieved data (or more). In other embodiments, the output buffer 212 is only partially filled with data request in a read operation. In these embodiments, the remainder of the output buffer 212 may be empty, dirty, or filled with additional data retrieved as part of the retrieval operations associated with the initiated read operation. For reference, the additional data content within the buffer is referred to herein as surplus buffer content. In some embodiments, the surplus data content from the output buffer 110 is pre-fetched into the cache 114.

Figure 3:
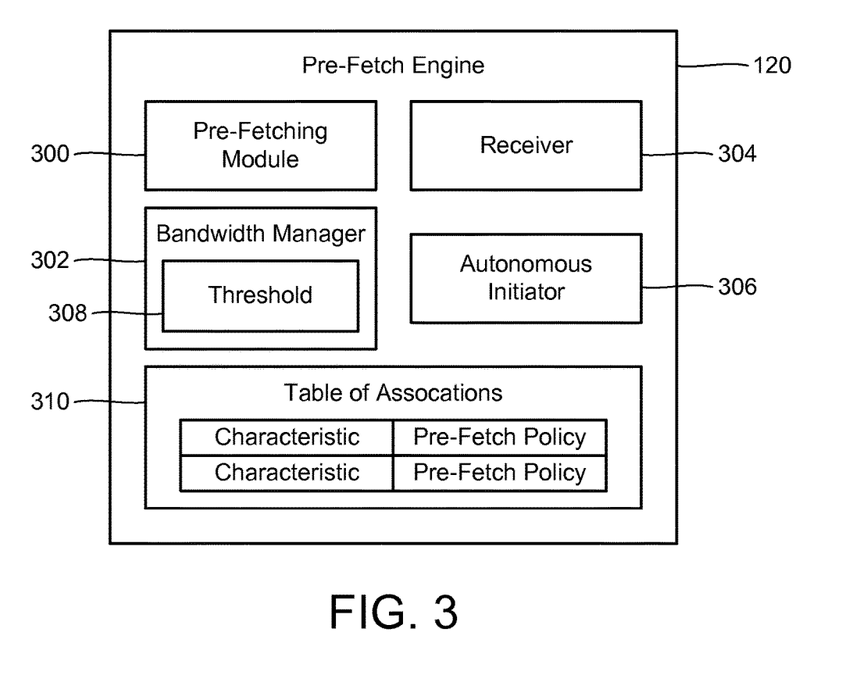
FIG. 3 depicts a schematic diagram of one embodiment of the pre-fetch engine of FIG. 1.

FIG. 3 depicts a schematic diagram of one embodiment of the pre-fetch engine 120 of FIG. 1. Although the pre-fetch engine 120 is described herein in conjunction with the cache warming system 100 of FIG. 1, the pre-fetch engine 120 may be used in conjunction with any type of cache warming system 100. The pre-fetch engine 120 may also be used in conjunction with any type of memory cache 114.

The pre-fetch engine 120 may include various components that allow the pre-fetch engine 120 to perform the operations described herein in conjunction with the cache warming system 100. In one embodiment, the pre-fetch engine 120 includes a pre-fetching module 300, a bandwidth manager 302, a receiver 304, and an autonomous initiator 306. The bandwidth manager 302 may store one or more thresholds 308, which are described in more detail herein. The illustrated pre-fetch engine 120 also includes a table of associations 310. The pre-fetch engine 120 also may include additional components not shown.

The pre-fetching module 300 may be configured to determine sequential blocks from the data store 110 to copy to the memory cache 114. In one embodiment, the pre-fetching module 300 determines which blocks from the data store 110 to pre-fetch based on a priority of the LBAs at the pre-fetch engine 120. The priority of the LBAs may be indicated using block identifiers (or tags) as described in more detail below. LBAs of a given priority in the pre-fetch engine 120 may or may not map to sequentially stored PBAs, such that the pre-fetching module 300 may make a determination of sequences of PBAs to pre-fetch for the memory cache 114 based on the priority of the LBAs.

The pre-fetching module 300 may also determine the number of sequential blocks to copy from the data store 110. In one embodiment, the number of sequential blocks determined by the pre-fetching module 300 is based on bandwidth available for pre-fetching data. For example, the bandwidth manager 302 monitors an aggregate bandwidth to the data store 110, and the pre-fetching module 300 determines how many sequential blocks may be pre-fetched to the memory cache 114 given the available bandwidth. By limiting the bandwidth used to pre-fetch data from the data store 110, the pre-fetch engine 120 may prevent data pre-fetching operations from interfering with concurrent application access to the data store 110. In one embodiment, the bandwidth manager 302 determines a threshold 308 for bandwidth for pre-fetching data. The threshold 308 may be determined based on the amount of bandwidth consumed by the application access. For example, the threshold 308 may be a certain percentage of the excess bandwidth. The bandwidth used to pre-fetch data is then at or below the threshold 308. The threshold 308 may change as application access to the data store 110 increases or decreases, allowing the pre-fetch engine 120 to pre-fetch less or more data depending on how much bandwidth is available. Alternatively, the threshold 308 may be established independently of the bandwidth consumed by a particular application access. In one embodiment, the threshold is determined dynamically based on historical information describing the data stored in the cache 114, data stored in the data store 110, available bandwidth, and/or other criteria. This may allow the threshold to change to increase cache warming efficiency during initial operations to fill the cache 114 with valid data.

In one embodiment, the pre-fetch engine 120 receives the access request from the application, modifies the access request to include a certain number of sequential blocks from the data store 110, and submits the modified access request to the data store 110. In another embodiment, the pre-fetch engine 120 receives the access request for a particular block from the data store 110 and submits or passes the access request to the data store 110 without modification. The pre-fetch engine 120 also generates a separate access request with a number of sequential blocks related to the requested block from the data store 110 and submits the separate access request to the data store 110.

In some embodiments, block identifiers describe blocks in the data store 110 that can be used to inform pre-fetching decisions. The block identifiers may be stored on the memory cache 114 or on a non-volatile storage. In some embodiments in which the memory cache 114 is at least partially non-volatile, it is possible to preserve cache data across restarts, but the cache data may be invalidated from the perspective of an application accessing the memory cache 114. In some embodiments, the data stored on the memory cache 114 may be inaccurate—for example, if the memory cache 114 is volatile or if the data store 110 has been modified between the cache shutdown and cache restart. In one embodiment, the data store 110 may be modified between restarts in a system which implements a shared data store accessible to multiple memory caches 114. Protocols such as network file system (NFS) may have built in support for cache data validation (via timestamps, etc.), but block based storage area network (SAN) protocols may lack such support.

In one embodiment, the block identifiers are preserved and used to prioritize pre-fetching decisions, rather than cache content, because the cache content is invalidated. The block identifiers may identify which data was present in the cache 114 before cache restart rather than the actual data itself, which may be leveraged to approximate a state of the cache content at the time of reboot. In one embodiment, the cache 114 may have a read-ahead policy that reads only blocks that have existing block identifiers while the cache 114 is being warmed during concurrent application access. Although the present embodiment describes the use of block identifiers in making pre-fetching decisions, the data stored on the memory cache 114 may also or alternatively be used to make pre-fetching decisions.

In some embodiments, the pre-fetch engine 120 may also include a write log to monitor writes to the LBAs 122. By monitoring the writes, the pre-fetch engine 120 may be able to distinguish between recently stored blocks of data and blocks of data stored in the cache 114 that may not have been used or written for a longer period of time than the newer blocks of data stored based on when the blocks of data were written to the cache 114. The write log may be used to further inform pre-fetch priority in conjunction with the PBAs corresponding to the block identifiers. The pre-fetch engine 120 may use other components or methods of determining a pre-fetch priority for selecting data from the data store 110 to warm the cache 114.

In some embodiments, the receiver 304 receives, monitors, or intercepts read commands directed to the backing data store 110. In the event that the pre-fetch engine 120 is in a mode configured to pre-fetch data to the cache (e.g., in a cache warming mode), the receiver 304 may inform the pre-fetching module 300 which, in turn, may perform additional pre-fetching operations in conjunction with the read operation that is directed to the backing data store 110. Since these additional pre-fetching operations are not explicitly instructed by another component of the computer system 100, these pre-fetching operations are referred to herein as implicit pre-fetching operations. In some embodiments, the autonomous initiator 306 is invoked to facilitate autonomous pre-fetching operations by the pre-fetch engine 120 and the pre-fetching module 300.

Additionally, in some embodiments, the receiver 304 may receive commands directed specifically to the pre-fetch engine 120 or the cache 114. In the event that such commands explicitly instruct the pre-fetch engine 120 to pre-fetch data from the backing data store 110, the receiver 304 may pass along those instructions, or corresponding instructions, to the pre-fetch module 300 so that the pre-fetch module 300 can pre-fetch the requested data.

In one embodiment, the table of associations 310 stores one or more associations between certain characteristics of a backing data store 110 (or multiple backing data stores 110) and specific pre-fetch processes. This allows the pre-fetch engine 120, in some embodiments, to select and implement a specific type of pre-fetch policy that is dependent on, or tailored to, the specific corresponding characteristic(s) of a particular backing data store 110. Although an apparent one-to-one relationship exists with the characteristics and the pre-fetch policies shown in the depicted table of associations 310 of FIG. 3, other embodiments, may have a many-to-one or a one-to-many relationship between different characteristics and pre-fetch policies. For reference, other implementations may refer to the pre-fetch policies as pre-fetch processes, pre-fetch methods, pre-fetch algorithms, and so forth. Additionally, although the table of associations 310 is illustrated and described as a table, other implementations may utilize any form of data structure to store or otherwise represent the relationships between different characteristics and pre-fetch policies.

It can be understood that a particular pre-fetch process may be more efficient or effective when implemented with a particular type of backing data store 110 than another type of pre-fetch process might be with another type of backing data store 110. This table of associations 310 allows the pre-fetch engine 120 to select a specific pre-fetch process that is associated with one or more characteristics of the backing data store to which the cache 114 is coupled. Examples of specific pre-fetch processes which might be selected include, but are not limited, the various implicit pre-fetch and explicit pre-fetch that are described herein. In other embodiments, other types of pre-fetch process may be implemented.

Figure 4:
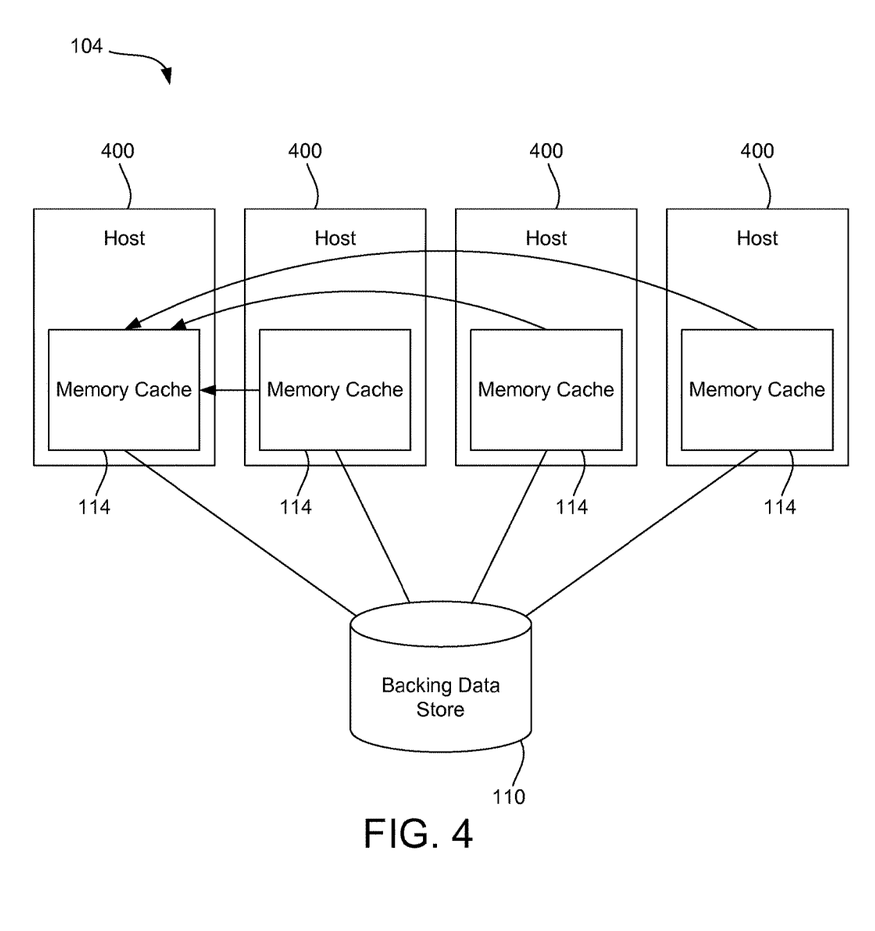
FIG. 4 depicts a schematic diagram of one embodiment of a network of hosts connected to a backing data store.

FIG. 4 depicts a schematic diagram of one embodiment of a network 104 of hosts 400 connected to a backing data store 110. In some embodiments, multiple memory caches 114 in a clustered environment are connected to a single data store 110. Each memory cache 114 may be part of a separate host 400 on a network 104 of devices that are each connected to a single data store 110. Alternatively, a single host 400 may include more than one memory cache 114. Because each of the memory caches 114 has access to the data store 110, the data on the data store 110 may change frequently due to access from many different applications on many different hosts 400.

In one embodiment, when determining which data from the data store 110 to pre-fetch to a memory cache 114 upon initialization of the cache 114, the memory cache 114 may use information from the other memory caches 114 in the network 104 to determine pre-fetching priority. In one example, the initialized memory cache 114 may import block identifiers from at least one other memory cache 114 in the network 104. This may be useful if the workloads on the host devices 400 containing each memory cache 114 are similar or if a single application accesses multiple memory caches 114. Transmitting block identifiers between caches 114 in the network 104 may require very little bandwidth, and allows the cache 114 receiving the block identifiers to then be pre-warmed based on its own available bandwidth. Thus, while the data on the data store 110 may change frequently, the caches 114 may make informed pre-fetching decisions in an attempt to be more efficient during the warm-up phase.

Figure 5:
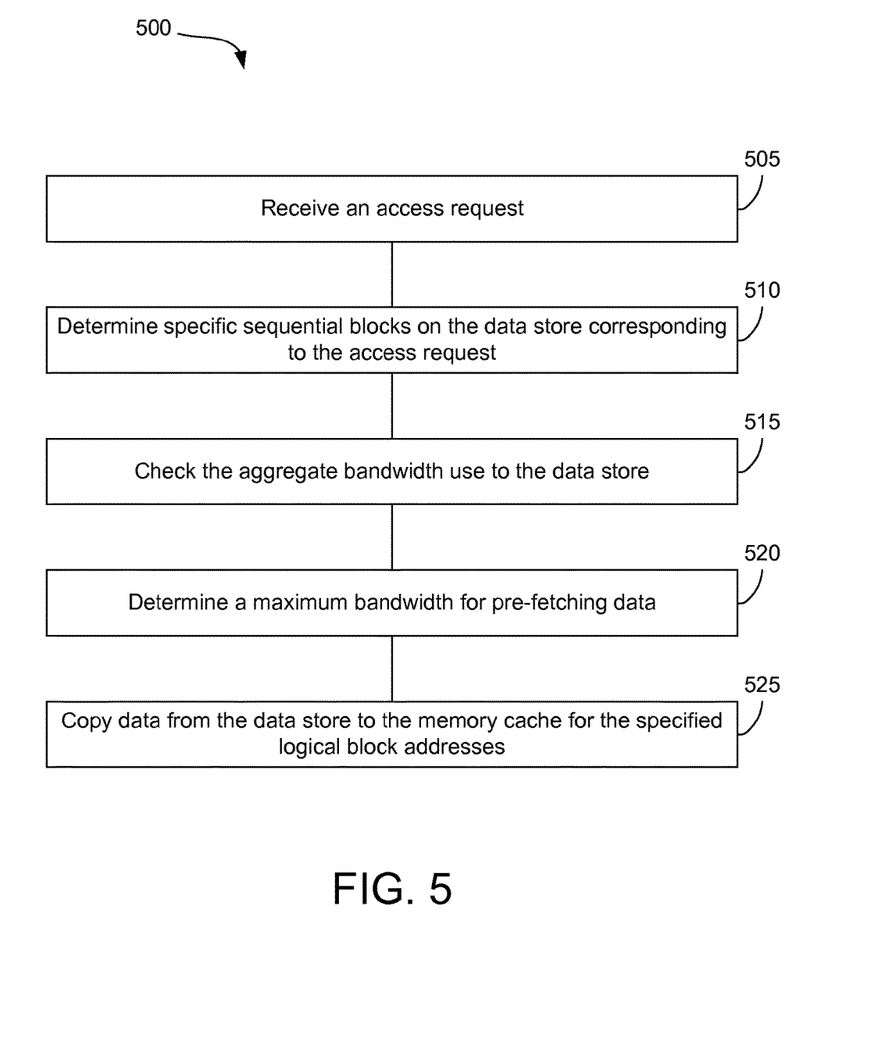
FIG. 5 depicts a flow chart diagram of one embodiment of a method for warming a memory cache.

FIG. 5 depicts a flow chart diagram of one embodiment of a method 500 for warming a memory cache 114. Although the method 500 is shown and described in conjunction with the cache warming system 100 and memory cache 114 of FIG. 1, other embodiments of the method 500 may be implemented with other cache warming systems 100 and/or memory caches 114.

The ATL 112 maps LBAs 122 to physical addresses in the memory cache 114, and may map LBAs 122 to PBAs on the data store 110. The physical addresses correspond to memory elements 120 in the memory cache 114 configured to store data. Because the ATL 112 maps the physical addresses to LBAs 122, the ATL 112 is able to monitor and manage where data is stored on the memory cache 114 in a logically organized manner. Thus, while related data may be stored at very different physical locations in the memory cache 114, the LBAs 122 allow related data to be logically grouped together for the ATL 112 and applications interacting with the memory cache 114 via the ATL 112 to view and access.

The method 500 includes warming the memory cache 114 using sequential pre-fetching of data stored in the data store 110. The method 500 may include warming the memory cache 114 on startup of the memory cache 114 and during application use of the memory cache 114. The method 500 includes receiving 505 a data access request from an application, the data access request corresponding to a specific location on the data store 110. The location may be a particular block or group of blocks on the data store 110.

The pre-fetch engine 120 determines 510 specific sequential blocks corresponding to block of the data the access request. In one embodiment, the sequential blocks are located sequentially after the block(s) identified in the access request. The method 500 may include over-fetching data from the data store 110 for a predetermined number of blocks on the data store 110 proximate the given block corresponding to the access request.

The pre-fetch engine 120 may limit the bandwidth used to pre-fetch the data to meet a predetermined threshold 308. The threshold 308 may be based on an amount of bandwidth consumed by application access to the memory cache 114. For example, the pre-fetch engine 120 checks 515 the aggregate bandwidth use to the data store 110. The pre-fetch engine 120 then determines 520 a maximum bandwidth for pre-fetching data and sets the threshold 308 for pre-fetching data. In some embodiments, the threshold 308 is determined based on the amount of bandwidth consumed by application access to the memory cache 114. Consequently, the threshold 308 may change as bandwidth consumed by application access to the data store 110 increases or decreases. The pre-fetch engine 120, e.g., via the pre-fetch module 300, then copies 525 data from the sequential blocks on the data store 110 to the memory cache 114 at specified LBAs 122 of the memory cache 114. For example, the pre-fetch module 300 determines which PBAs on the data store 110 to copy to the memory cache 114 based on a requested PBA. The pre-fetch module 300 may pre-fetch PBAs that are sequential to the requested PBA to the memory cache 114 while accounting for bandwidth restrictions to the data store 110.

In one embodiment, the pre-fetch engine 120 receives an explicit pre-fetch request from an external utility 118. The pre-fetch request describes a sequence of reads at particular blocks on the data store 110. The external utility 118 may be configured to run concurrently with application access to the memory cache 114. The pre-fetch engine 120 then performs the sequence of reads at the corresponding blocks on the data store 110 to warm the cache 114. The utility 118 may have a priority set to not compete with applications for bandwidth to the data store 110.

In another embodiment, the pre-fetch engine 120 receives an explicit pre-fetch request from an application. The pre-fetch request describes a sequence of blocks on the data store 110 that are likely and/or unlikely to be used by the application. For example, blocks that are likely to be used may correspond to applications that are used frequently, and blocks that are unlikely to be used may correspond to applications that are used infrequently or rarely. The pre-fetch engine 120 then designates the sequence of blocks as high or low priority, respectively for warming the cache 114. Thus, the high priority blocks may be warmed before the low priority blocks. In some embodiments, low priority blocks may be excluded from the cache warming process so that the cache 114 is not warmed with data that is unlikely to be used.

Figure 6:
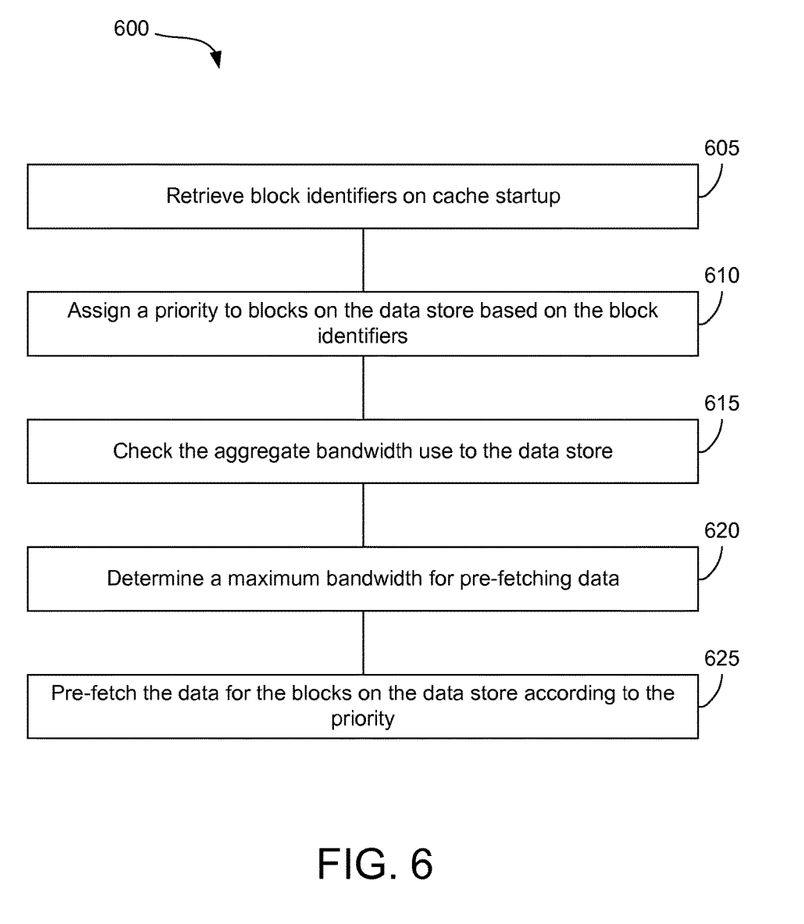
FIG. 6 depicts a flow chart diagram of another embodiment of a method for warming a memory cache.

FIG. 6 depicts a flow chart diagram of another embodiment of a method 600 for warming a memory cache 114. Although the method 600 is shown and described in conjunction with the cache warming system 100 and memory cache 114 of FIG. 1, other embodiments of the method 600 may be implemented with other cache warming systems 100 and/or memory caches 114.

In one embodiment, the pre-fetch engine 120 is configured to warm the memory cache 114 by assigning a priority to blocks on the data store 110 based on block identifiers which identify data stored at LBAs 122 prior to full initialization of the memory cache 114. The pre-fetch engine 120 retrieves 605 the block identifiers on cache initialization. In some embodiments, the pre-fetch engine 120 receives the block identifiers from another memory cache 114 in a clustered caching environment. The clustered caching environment may include several hosts 400, each having one or more memory caches 114 that have access to the data store 110. In other embodiments, the pre-fetch engine 120 receives the block identifiers from a non-volatile storage, which may be on the memory cache 114 or any other storage device accessible to the pre-fetch engine 120.

In one embodiment, the pre-fetch engine 120 is further configured to assign 610 the priority to blocks on the data store 110 based on a log position associated with each block identifier. The log position may indicate or be related to a timestamp associated with the block identifiers. The log may indicate a write time for data stored in the cache 114, allowing the pre-fetch engine 120 to distinguish between older and newer blocks of data in the cache 114. The age of the data in the cache 114 may inform the pre-fetch priority.

In one embodiment, the pre-fetch engine 120 is configured to limit the bandwidth used to pre-fetch the data to meet a predetermined threshold 308. The threshold 308 may be determined based on an amount of bandwidth consumed by application access to the memory cache 114. For example, the pre-fetch engine 120 may check 615 the aggregate bandwidth use to the data store 110 and determine 620 a maximum bandwidth for pre-fetching data. In embodiments in which the pre-fetch engine 120 receives block identifiers from other memory caches 114, the block identifiers take up little bandwidth and should not have a large effect on the amount of bandwidth the pre-fetch engine 120 may use for warming the cache 114. The pre-fetch engine 120 then pre-fetches 625 the data stored at the blocks on the data store 110 according to the priority assigned to the blocks without interfering with application access to the data store 110.

In further embodiments, the pre-fetch engine 120 also identifies and selects a particular pre-fetch process to implement with a given backing data store 110 based one or more characteristics of the given backing data store 110.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or memory devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system comprising:
a data store configured to store data on a storage medium; and
a memory cache subsystem configured to connect to the data store, wherein the memory cache subsystem comprises:
a plurality of memory elements configured to store cached data; and
a pre-fetch controller configured to:
determine a characteristic of the data store, the determined characteristic indicating a physical arrangement of data stored on the storage medium of the data store;
select a pre-fetch process for the data store from a plurality of pre-fetch processes based on associations between the determined characteristic of the data store and the pre-fetch processes, the associations identifying one or more pre-fetch processes configured to efficiently pre-fetch data stored in the indicated physical arrangement of the data stored on the storage medium of the data store;
change a memory access bandwidth limit for the pre-fetch process for pre-fetching data from the data store based on an amount of bandwidth used by an application for at least one memory access operation to the plurality of memory elements associated with the application accessing data in the data store; and
execute the selected pre-fetch process to retrieve pre-fetch data corresponding to a designated logical address from the data store for storage in one or more of the memory elements, wherein:
a first pre-fetch process associated with a sequential physical data arrangement is configured to pre-fetch additional data physically proximate to the pre-fetched data on the storage medium of the data store; and
a second pre-fetch process associated with one or more of a random physical data arrangement and a pseudo-random physical data arrangement is configured to pre-fetch the data corresponding to the designated logical address without pre-fetching the additional data.

2. The system of claim 1, wherein the physical arrangement of the data stored on the storage medium of the data store is one of: the sequential data arrangement, the random data arrangement, and the pseudo random data arrangement.

3. The system of claim 1, wherein:
the pre-fetch controller is further configured to receive a read operation initiated external to the memory cache subsystem; and
the first pre-fetch process is further configured to pre-fetch data from sequential physical locations on the storage medium of the data store in response to the read operation.

4. The system of claim 1, wherein:
the pre-fetch controller is further configured to receive a pre-fetch operation pertaining to the designated logical address initiated external to the memory cache subsystem; and
the first pre-fetch process is configured to pre-fetch the additional data from sequential physical locations of the storage medium of the data store in response to the pre-fetch operation initiated external to the memory cache subsystem.

5. The system of claim 4, wherein the pre-fetch controller is further configured to receive the pre-fetch operation from the application, the application running external to the memory cache subsystem.

6. The system of claim 4, wherein the pre-fetch controller is further configured to receive the pre-fetch operation from an external utility of a computing device communicatively coupled to the pre-fetch controller.

7. The system of claim 1, wherein:
the determined characteristic of the data store further indicates a size of an output buffer of the data store; and
the pre-fetch controller is further configured to retrieve the pre-fetch data from surplus buffer content in the output buffer of the data store by use of the selected pre-fetch process.

8. The system of claim 1, wherein the pre-fetch controller is further configured to autonomously initiate a pre-fetch operation in response to a determination that at least some of the plurality of memory elements of the memory cache subsystem are available and ready to be written with the pre-fetch data.

9. The system of claim 1, wherein the pre-fetch controller is further configured to initiate a plurality of pre-fetch operations to fill up the plurality of memory elements of the memory cache subsystem during an initial operation period after startup of the memory cache subsystem.

10. The system of claim 9, further comprising an address translation layer configured to connect to the memory cache subsystem, wherein the pre-fetch controller is further configured to receive a cache status indication from the address translation layer, wherein the cache status indication indicates whether the plurality of memory elements are full with cached data.

11. The system of claim 1, wherein the pre-fetch controller is further configured to limit usage of processing resources allocated to pre-fetch operations in response to a memory access operation initialized by a software application.

12. The system of claim 11, further comprising an address translation layer configured to connect to the memory cache subsystem, wherein the pre-fetch controller is further configured to receive an instruction from the address translation layer to limit the usage of the processing resources allocated to the pre-fetch operations.

13. A method, comprising:
determining a characteristic of a storage device, the determined characteristic indicating a physical arrangement of data stored on a storage medium of the storage device;
selecting a pre-fetch process for the storage device from a plurality of pre-fetch processes based on associations between the determined characteristic and respective pre-fetch processes, the associations identifying pre-fetch processes configured to efficiently pre-fetch data stored in the physical arrangement indicated by the determined characteristic;
changing a memory access bandwidth limit for the pre-fetch process for pre-fetching data from the storage device based on an amount of bandwidth used for at least one memory access operation to a cache associated with an application accessing data on the storage device; and
implementing the selected pre-fetch process to admit pre-fetch data of the storage device into the cache, wherein:
implementing a first pre-fetch process associated with a sequential physical data arrangement comprises retrieving designated data from the storage device with additional data physically proximate to the designated data within the storage device; and
implementing a second pre-fetch process not associated with the sequential physical data arrangement comprises retrieving the designated data from the storage device without retrieving the additional data.

14. The method of claim 13, wherein implementing the first pre-fetch process further comprises:
receiving a read operation to read data from the storage device, wherein the read operation specifies at least one block of data;
admitting the specified block of data into the cache; and
pre-fetching at least one additional block of data to admit into the cache in response to the read operation.

15. The method of claim 13, further comprising:
receiving a pre-fetch request from an external application, wherein the pre-fetch request identifies a sequence of blocks on the storage device; and
admitting the sequence of blocks identified in the pre-fetch request into the cache in response to the pre-fetch request.

16. The method of claim 15, further comprising designating the sequence of blocks as high priority for populating the cache from an initial state following startup of the cache.

17. The method of claim 15, further comprising designating the sequence of blocks identified in the pre-fetch request as low priority for populating the cache from an initial state following startup of the cache.

18. The method of claim 13, further comprising throttling the memory access bandwidth limit for the pre-fetch process in response to an explicit instruction from an address translation layer.

19. The method of claim 13, further comprising throttling the memory access bandwidth for the pre-fetch process in response to a determination regarding a level of completion of populating the cache from an initial state following startup of the cache.

20. An apparatus, comprising:
means for determining a characteristic of a backing store, the determined characteristic indicating a physical data arrangement of data stored within the backing store;
means for identifying a pre-fetch process to execute for the backing store, the identified pre-fetch process selected from a plurality of pre-fetch processes based on associations between respective physical data arrangements and pre-fetch processes, of the plurality of pre-fetch processes, configured to efficiently retrieve data stored in the respective physical data arrangements;
means for changing a memory access bandwidth limit for the pre-fetch process for pre-fetching data from the data store based on an amount of bandwidth used for at least one memory access operation to a memory cache associated with an application accessing data in the backing store; and
means for executing the identified pre-fetch process to pre-fetch a designated data block from the backing store for storage within the cache, wherein:
a first pre-fetch process associated with a sequential physical data arrangement is configured to acquire additional data blocks from one or more sequential physical locations of the backing store; and a second pre-fetch process not associated with the sequential physical data arrangement is configured to pre-fetch the designated data block without acquiring the additional data blocks.

21. The apparatus of claim 20, further comprising means for selecting the identified pre-fetch process from a table associating the respective physical data arrangements with the pre-fetch processes configured to efficiently retrieve the data stored in the respective physical data arrangements.

22. The apparatus of claim 21, wherein the table associates the second pre-fetch process with one or more of a random physical data arrangement and a pseudo random physical data arrangement.

23. The apparatus of claim 20, wherein the identified pre-fetch process is configured to pre-fetch the designated data block from the backing store in response to an explicit pre-fetch request.

24. The apparatus of claim 20, further comprising means for executing an implicit pre-fetching operation in response to a read command pertaining to a first data block of the backing store, the implicit pre-fetching operation comprising prefetching a second data block, different from the first data block, in response to the read command.

* * * * *